Patented Nov. 29, 1932

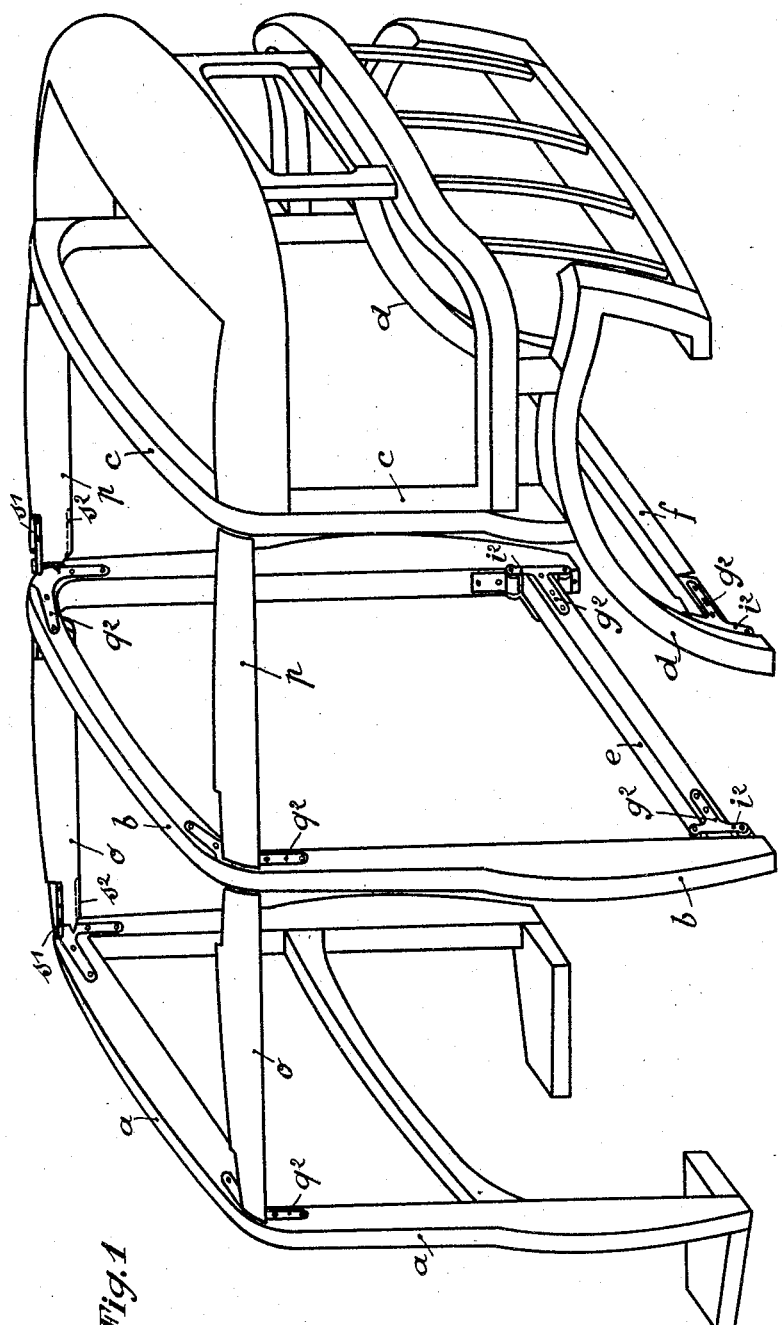

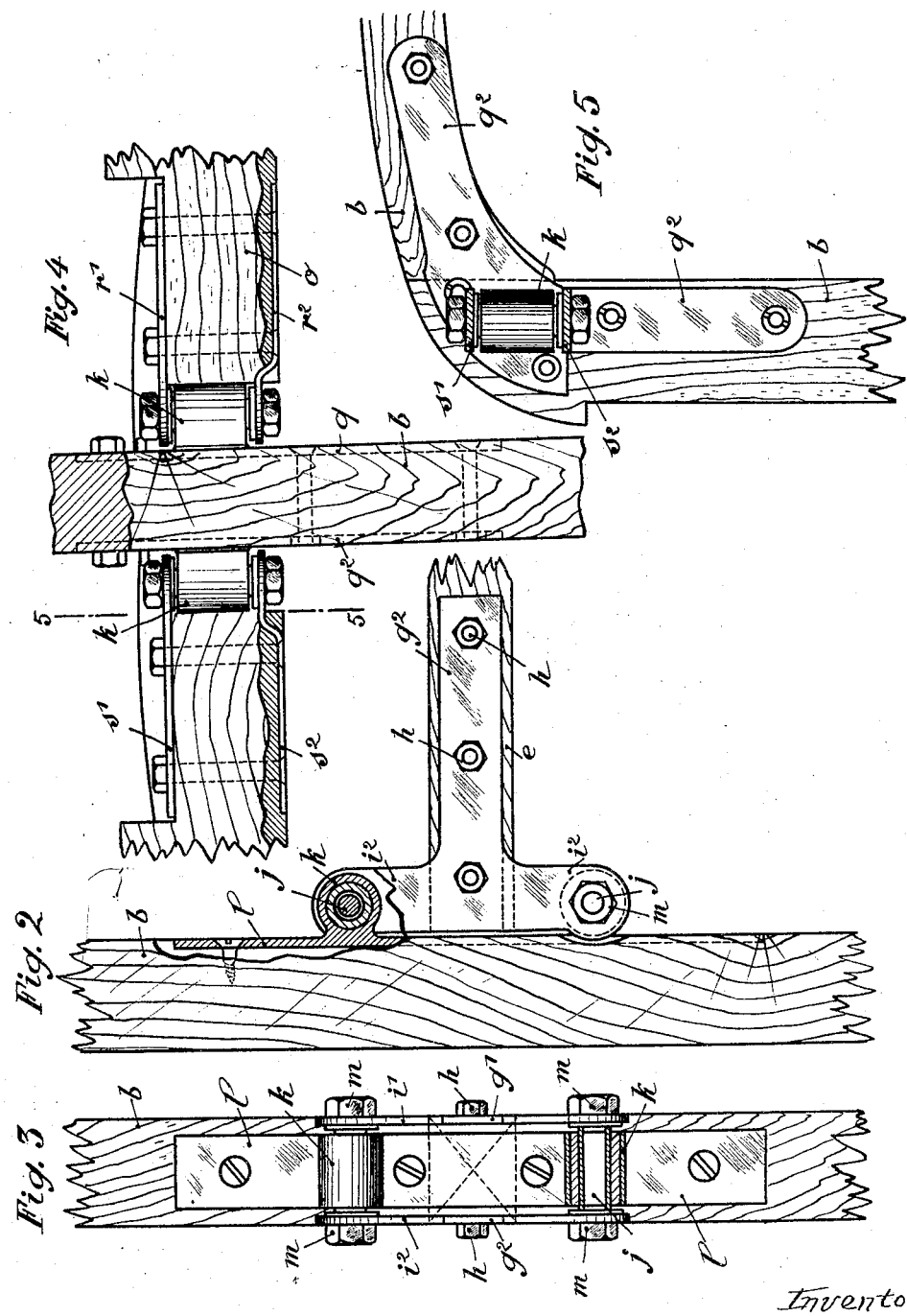

1,889,058

UNITED STATES PATENT OFFICE

MARIUS JOSEPH DASTE, OF COURBEVOIE, FRANCE

FLEXIBLE BODY CONSTRUCTION

Application filed July 23, 1930, Serial No. 470,218, and in France February 12, 1930.

The object of the present invention is a system of assembling elements or members, such as pieces of wood (posts, transversal members, longitudinals or side frame members and the like), which are fitted in such a manner as to leave the assembled members or elements a certain amount of freedom of movement in various directions, whilst at the same time holding securely in position. This assembling system is characterized by the use of elastic joints called "silent blocks" comprising as is well known two concentric tubes or sockets which contain between them compressed rubber. According to my invention, I interpose silent blocks between the elements or members, the socket or outer tube of the silent block being integral with an iron fitting which is bolted or fixed on to one of the elements or members, whilst the interior tube of the silent block has a pin or spindle going through it, which is supported by means of an iron fitting fitted on the other member.

One of the most interesting applications of this system of assembly consists in the building of a motor car body, in which:—

(a) The framework rests by means of silent blocks provided at the extremities of the transversal members fixed to the longitudinals of the chassis, in such a manner that the pronounced vibrations of the chassis are not transmitted to the framework.

(b) The assembling joints of the members of the framework are provided with silent blocks.

According to one means of carrying the invention into effect, transversal members or cross pieces are assembled at the lower part of the arches of the framework by means of two iron fittings of T-shape, of which the shoulder is bolted on the front and rear faces of each transversal member or cross piece, the branches of these T pieces supporting the axles or pins of the two silent blocks, the sockets of which are integral with plates fitted or secured to the lower part of the arches.

The following description, in conjunction with the appended drawings, given only as an example, will make it possible to clearly understand the manner by means of which the invention can be carried into effect.

Figure 1 is a diagrammatic view of the framework of a motor car body built according to the invention.

Figure 2 is a front view, showing the assembly of a transverse or cross piece on an arch of the body.

Figure 3 is a side view of Figure 2.

Figure 4 is a front view of the interior of the body, showing the assembly of the two panels of the roof with an arched member.

Figure 5 is a side view, partly in section, through 5—5 of Figure 4.

The coach body shown in Figure 1 consists of two arches $a$, $b$, and a hind part comprising an arch $c$ rigidly fitted to the curved member $d$. The arches $b$ and $c$ rest by means of silent blocks or other resilient joints provided at the extremities of the transversal members $e$, $f$, which are themselves bolted to the chassis of the car. A detail of this resilient joint is shown in the Figures 2 and 3. At each extremity of the cross piece or transversal member $e$, the iron fittings T, $g^1$, $g^2$ are fitted both on the front and back face; bolts $h$ pass through the cross piece $e$ and fix the base or shoulder of the T piece on it. Between the extremities, and at right angles to the legs $i^1$, $i^2$ of the two T shaped fittings, the two axes or spindles $j$ of the silent blocks are mounted, the sockets $k$ of which are of one piece with the small plates $l$ screwed or fixed on the inner face of the arches $b$. It is self-evident that the branches of the T piece constitute in a way a cap or housing supporting the spindles of the silent block.

The socket $k$ may be made integral with the plate $l$ in any suitable manner, for instance by means of autogenous or electric welding. At the extremities of the spindle of the silent block the nuts $m$ are screwed up tight and locked.

It is evident that by reason of this arrangement the uprights or posts of the arch are maintained in a rigorously vertical position, that is to say, perpendicular to the transverse or cross piece $e$, but that when the vibrations occur, the silent blocks allow of a slight deformation in relation to the whole assembly by reason of the provision of the rubber sheath with which the silent block is provided.

A similar method of assembling is provided between the extremities of the hind transversal members or cross pieces $f$ and the curved members $d$ of the hind part of the top.

As to the method of assembly between the panels or cant rails $o$, $p$ of the front and rear doors and the arch $b$, this may be effected as shown in the Figures 4 and 5. On both sides of the arch the iron fittings $q^1$, $q^2$ are fitted, for instance, by means of bolts, which fittings are integral with the sockets $h$ of the two silent blocks, the spindles of which are supported between two small plates or fittings $r^1$, $r^2$, which are bolted to the cant rails $o$ and $s^1$, $s^2$ which are bolted to the cant rails $p$. The two cant rails $o$, $p$ are thus held in such a position that they form an extension one of the other by reason of their being assembled end to end on the arch $b$, but it is evident that they are free to come out of alignment, by reason of the elasticity of the silent block.

This method of assembling is also present between the cant rails of the roof $o$ and the transversal members in front of the arch $a$ as well as between the hind cant rails $p$ and the cross pieces of the rear arch $c$ of the canopy or dome.

It must be pointed out that by the very reason of the construction of the silent block (the flexible part of which is formed by a sheath of compressed rubber) the whole assembled or framed-up structure of the car remains rigid, as long as the stresses to which the assembled members or pieces are subjected do not reach a certain value, and becomes resilient as soon as that value of the stresses is reached. Moreover, the amplitude of the deformation allowed by this flexible joint is limited under these conditions the framework of the motor body holds perfectly together whilst at the same time having a great resiliency or flexibility and completely suppressing noises, vibrations and rattling. This resilient assembly replaces the tenons, mortises and square pieces used for the fitting together of the wood pieces; it is also adaptable to the fitting together and jointing of metallic members and in that case replaces the welds or fitting parts, for instance if it is intended to build a resilient metallic motor body.

It is, of course, self-evident that modifications of details of this system of assembly or body building just described may be made without by reason thereof going outside the scope of the invention.

What I claim is:—

1. A flexible motor vehicle body comprising in combination, a vertical body element, an iron fitting secured to said element, two silent blocks having horizontal axes disposed one over the other whose outer members are rigidly secured to said fitting, an horizontal body element, two iron fittings disposed in vertical planes secured on either side of said last mentioned element, said iron fittings having each an upwardly and a downwardly extending projection, a pin passing through the interior element of the upper silent block, means for fixing the upper ends of the upwardly extending projections of the last mentioned fittings to the corresponding ends of said pin respectively, a pin passing through the interior element of the lower silent block, means for fixing the lower ends of the downwardly extending projections of the last mentioned fittings to the corresponding ends of the last mentioned pin respectively.

2. A flexible motor vehicle body comprising in combination, a vertical body element, an iron fitting on said element, a plurality of screws for securing said fitting to said element, two silent blocks having horizontal axes disposed one over the other whose outer members are welded to said fitting, an horizontal body element, two iron fittings disposed in vertical planes on either side of said last mentioned element, bolts for securing said two last mentioned fittings to said last mentioned element, an upwardly and a downwardly extending projection on each of said last mentioned fittings, said projections being provided with holes at their ends, a pin extending throughout the interior member of the upper silent block so that its ends engage the holes provided at the upper ends of the upwardly extending projections of the last mentioned fittings respectively, a pin extending throughout the interior member of the lower silent block so that its ends engage the holes provided at the lower ends of the downwardly extending projections of the last mentioned fittings respectively, and bolts for securing said pins to said fittings respectively.

3. In a vehicle body, a horizontal transverse member, a substantially vertical member, two silent blocks having horizontal axes disposed one above the other, means for securing the inner element of the upper silent block to one of the above mentioned members, means for securing the outer element of the last mentioned silent block to the other member, means for securing the inner element of the lower silent block to one of said members, and means for securing the outer element of the last mentioned silent block to the other member.

4. In a vehicle body, a horizontal transverse member, a substantially vertical member, two silent blocks having horizontal axes disposed one above the other, means for securing the inner elements of both silent blocks to one of said members, and means for securing the outer elements of both silent blocks to the other member.

5. A vehicle body comprising in combination, a horizontal transverse member, a substantially vertical member having one side substantially parallel and close to the end of said horizontal member, two silent blocks having horizontal axes disposed one above the other, parallel to said side of the vertical member, means for securing the outer elements of both silent blocks to said side of the vertical member, and means for securing the inner elements of both silent blocks to the extremity of said horizontal member.

6. In a vehicle body, a horizontal transverse member, a substantially vertical member, a couple of coaxial metallic tubes having a horizontal axis, a sleeve made of an elastic material filling the annular space between said tubes, means for securing the inner tube to one of the above mentioned members, means for securing the outer tube to the other member, another couple of metallic tubes coaxially disposed within each other and parallel to the two first mentioned tubes, a sleeve made of an elastic material filling the annular space between the two last mentioned tubes, means for securing the inner tube of the last mentioned couple to one of said members, and means for securing the outer tube of said last mentioned couple to the other member.

7. In a vehicle body, a first body member, a second body member substantially at right angles to the first one and having its end close to the side of said first body member, two coaxial metallic tubes having their common axis at right angles to the plane in which said two body members are located, an elastic sleeve filling the annular space between said tubes, means for securing the inner tube to one of the above mentioned members, means for securing the outer tube to the other member, another couple of metallic tubes coaxially disposed within each other and parallel to the two first mentioned tubes, an elastic sleeve filling the annular space between the two last mentioned tubes, means for securing the inner tube of the last mentioned couple to one of said body members, and means for securing the outer tube of the last mentioned couple to the other body member.

8. In a vehicle body, a first body member, a second body member substantially at right angles to the first one and having its end close to the side of said first body member, two coaxial metallic tubes having their common axis at right angles to the plane in which said two body members are located, an elastic sleeve filling the annular space between said tubes, means for securing one of said tubes to the end portion of the second body member, means for securing the other tube to the first body member at a point thereof located on one side of the second body member, another couple of coaxial metallic tubes disposed within each other in parallel relation with the two first mentioned tubes, an elastic sleeve filling the annular space between the two last mentioned tubes, means for securing one of the two last mentioned tubes to the end portion of the second body member, and means for securing the other one of the two last mentioned tubes to the first body member at a point thereof located on the other side of the first body member.

9. In a vehicle body, a substantially vertical body member, a horizontal transverse member having its end close to the side of said vertical member, two coaxial metallic tubes having a horizontal axis at right angles to the vertical plane in which said two members are located, an elastic sleeve filling the annular space between said tubes, means for securing one of said tubes to the end portion of the horizontal transverse member, means for securing the other tube to the vertical body member at a point thereof located above the horizontal transverse member, another couple of metallic tubes coaxially disposed within each other in parallel relation with the two first mentioned tubes, an elastic sleeve filling the annular space between the two last mentioned tubes, means for securing one of the two last mentioned tubes to the end portion of the second body member, and means for securing the other one of the two last mentioned tubes to the vertical body member at a point thereof located below the horizontal transverse member.

In testimony whereof I have signed this specification.

MARIUS JOSEPH DASTE.